United States Patent [19]
Lammers

[11] 3,952,308

[45] Apr. 20, 1976

[54] PERSPECTIVE NAVIGATION SYSTEM EMPLOYING THE INNER COMPARISONS OF SIGNAL PHASES RECEIVED ON AN AIRCRAFT BY A PLURALITY OF SENSORS

[76] Inventor: Uve H. W. Lammers, 5 San Mateo Drive, Chelmsford, Mass. 01824

[22] Filed: May 21, 1974

[21] Appl. No.: 471,934

[52] U.S. Cl. ............................ 343/108 R; 343/102; 343/112 R; 235/150.22
[51] Int. Cl.² ........................................... G01S 1/16
[58] Field of Search ........ 343/108 R, 112 R, 112 C, 343/102; 235/150.22, 150.26

[56] References Cited
UNITED STATES PATENTS

| | | | |
|---|---|---|---|
| 2,226,860 | 12/1940 | Greig | 343/118 |
| 2,463,095 | 3/1949 | Wight et al. | 343/108 R |
| 3,237,195 | 2/1966 | Schiffman | 343/112 R |
| 3,503,071 | 3/1970 | Earp | 343/112 R |

*Primary Examiner*—Maynard R. Wilbur
*Assistant Examiner*—S. C. Buczinski
*Attorney, Agent, or Firm*—Joseph E. Rusz; Julian L. Siegel

[57] ABSTRACT

A perspective display of a runway is obtained on an aircraft by sequentially transmitting signals from selected marker positions about the runway. A plurality of sensors are positioned on the aircraft with a first sensor being compared to a reference frequency and the other sensors being compared each with the first sensor. The comparisons are made measuring the accumulated phase difference during a given time with these phase differences being equivalent to distances which are then fed to a computer and displayed as a perspective view.

5 Claims, 12 Drawing Figures

PERSPECTIVE NAVIGATION SYSTEM EMPLOYING THE INNER COMPARISONS OF SIGNAL PHASES RECEIVED ON AN AIRCRAFT BY A PLURALITY OF SENSORS

BACKGROUND OF THE INVENTION

This invention relates to navigation systems, and more particularly to a technique for electronically obtaining a perspective display aboard a linearly moving vehicle.

Perspective perception of space is very natural to man. The eye recognizes size, distance and orientation of objects, as well as their spatial arrangement on the basis of angular dimensions. Angular inputs to the brain and a vast amount of stored information permit man to navigate through his three-dimensional environment.

Electronic navigational aids have in many respects improved and supplemented human navigational capabilities, but in general they do not provide information, which is optimally interfaced with man's brain. They are not a substitute for perspective vision.

The present invention is a perspective navigation system, which provides basically the same information as vision does. A need for such a system is obvious in several practical situations, such as an aircraft landing under adverse weather conditions. Instrument landing systems are well known and improved versions are presently being developed, but known systems operate on the principle of a glide path and provide measurements of the aircraft deviation thereof.

In my copending application filed on the same date, there is disclosed a perspective navigation system in which a plurality of sensors detects signals from runway marker beacons and each of the detected signals are compared to a reference signal. However, in the present invention only a first sensor is compared to a reference signal while the others are then compared to the first. In addition, the present invention is based on different mathematical formulas.

SUMMARY OF THE INVENTION

The invention provides a perspective display on board a moving vehicle of a known configuration of stationary transmitters in order to permit perspective orientation of the navigating vehicle with respect to its environment and yields both the angular and radial location of a stationary transmitter of constant frequency f with respect to the moving vehicle. The vehicle motion must be linear over the measuring interval $2\Delta t$. Multiple spaced antennas on the vehicle provide phase information for each antenna and phase difference information between antennas.

The invention substitutes for actual perspective vision, which may be hampered on board an aircraft attempting to land under adverse weather conditions. From a perspective display of the runway, which is marked by constant frequency transmitters similar to the position lights at night, the pilot obtains information not only on the aircraft position but also its attitude and this information is presented in a form to which the human brain is best adapted.

It is therefore an object of this invention to provide a navigation method and system that displays perspective information.

It is another object to provide a perspective navigation method and system that does not depend on deviations from a glide path.

It is still another object to provide a perspective navigation system that eliminates the need for a pilot when landing an aircraft to make the transition from instrument landings to visual perception of the runway.

It is yet another object to provide a perspective navigation system that permits the pilot to simultaneously determine both the position and the attitude of the aircraft.

It is still another object to provide a perspective navigation system that operates with a higher redundancy than instrument landing systems used in the past.

These and other objects, advantages and features of the invention will become more apparent from the following description taken in connection with the illustrative embodiment of the accompanying drawings.

DESCRIPTION OF THE DRAWINGS

FIG. 1b shows a sequence of display representations of the aircraft approach as shown in FIG. 1a;

FIG. 2b shows a sequence of display representation of the aircraft's approach as shown in FIG. 2a;

FIG. 3b shows a sequence of display representation of the aircraft's approach as shown in FIG. 3a;

FIG. 3b shows a sequence of display representations of the aircraft's approach as shown in FIG. 3a;

FIG. 4b shows a sequence of display representations of the aircraft's approach as shown in FIG. 4a;

DETAILED DESCRIPTION OF THE PREFERRED EMBODIMENT

Considering a runway as a fairly narrow but very long rectangle, which is normally approached at low altitudes from the narrow side, it is sufficient to identify this structure by a minimum of three markers. Two of the markers are located at either corner of the approach end of the runway. The third is located at its far end, either at one corner or centered between the two corners. The position of the third marker is of minor importance since perspective practically contracts the far end into one point. Any number of additional markers can be placed along the runway, but is not necessary since the long narrow triangle permits unambiguous perspective identification of the aircraft position from any point within the hemisphere.

The markers either transmit continuous-wave signals of different frequencies, which can be separated according to frequency on board the moving vehicle before computing marker positions, or frequency $f$ is sequentially transmitted from all markers as a pulse of sufficient length to extract the required position information. In the latter case a substantial reduction in equipment complexity is possible.

Figure 1A:
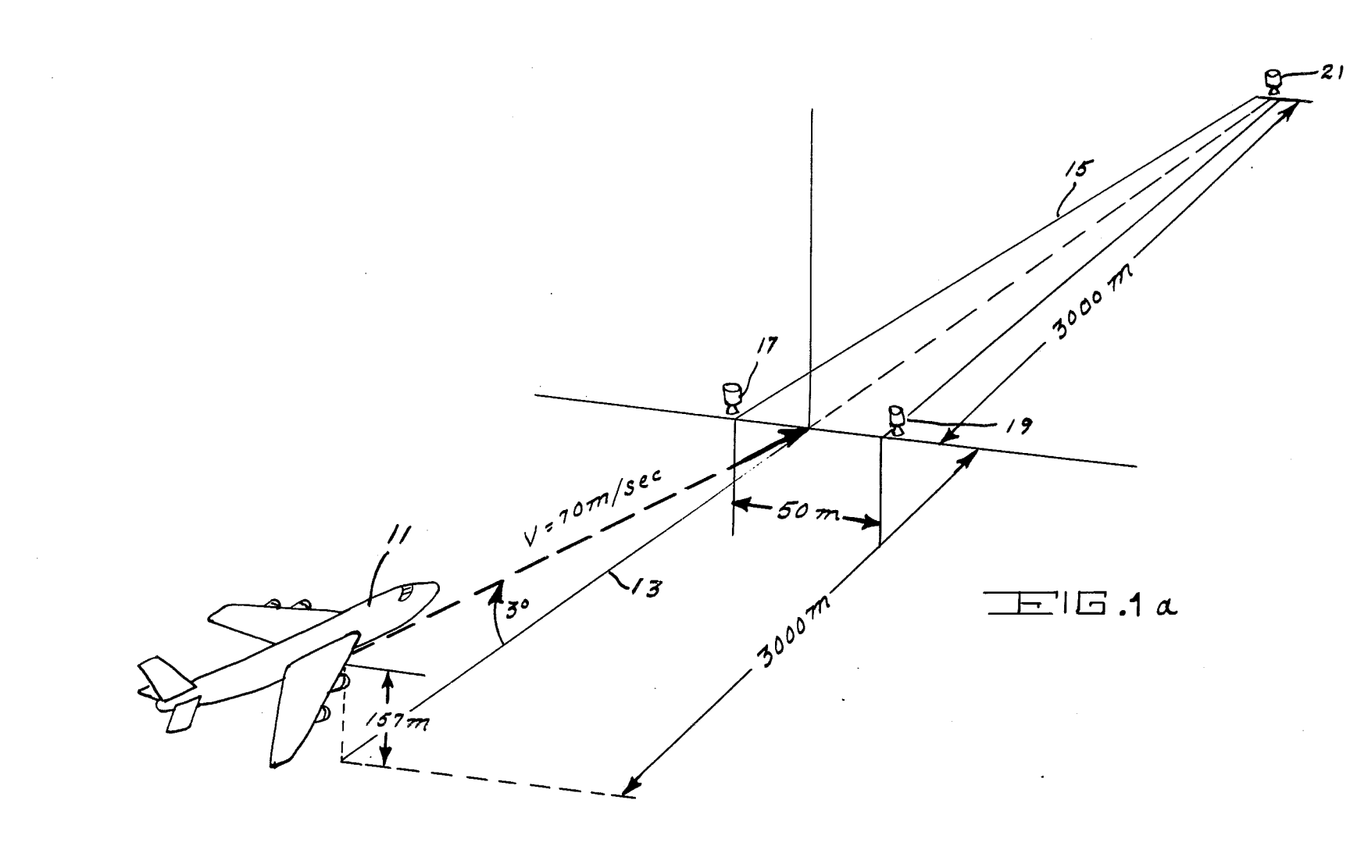
FIG. 1a is a perspective view of an aircraft in a correct approach to the runway.
Figure 1B:
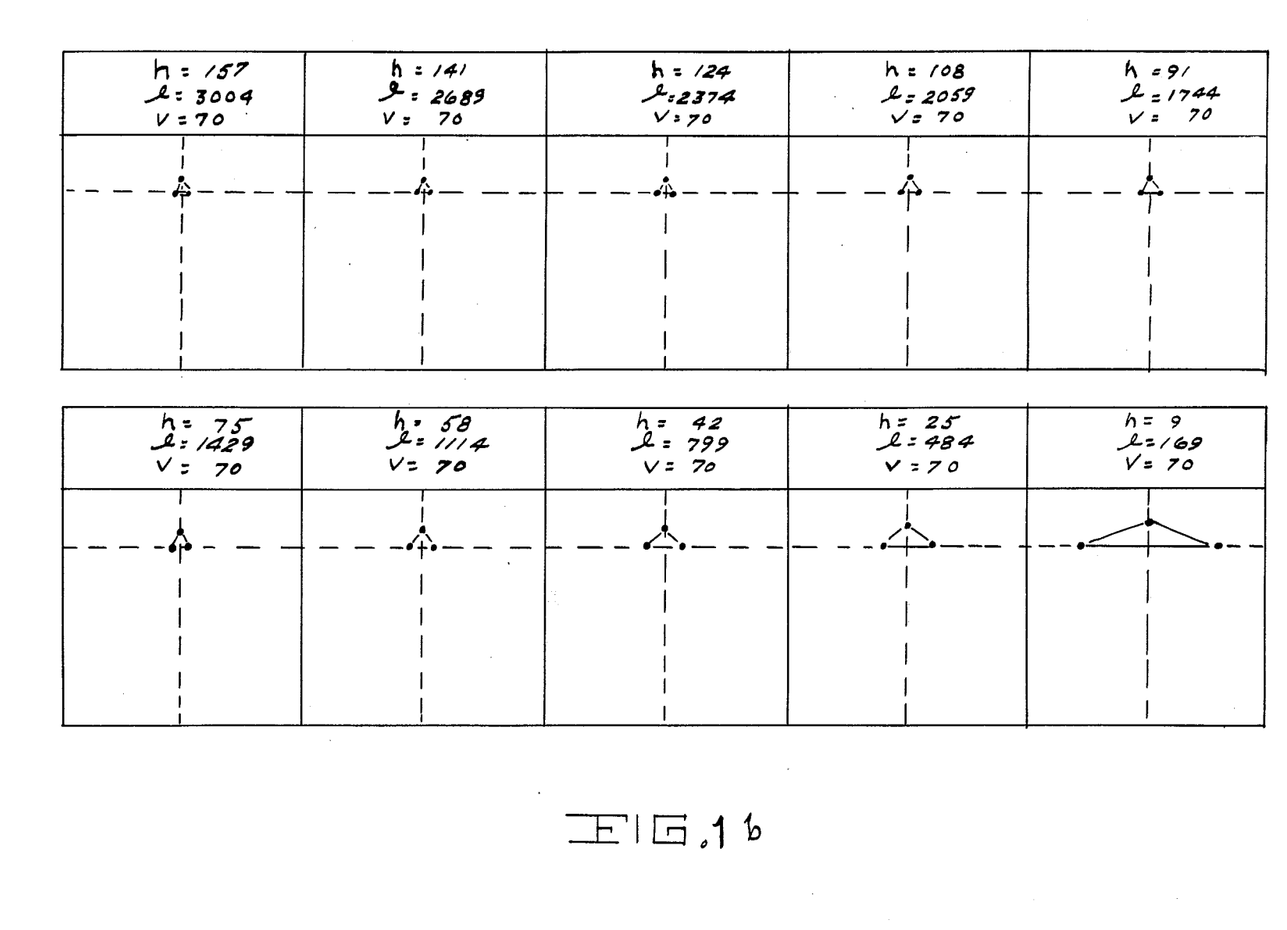

Referring to FIG. 1a, there is shown a perspective view of aircraft 11 making a correct approach on center line 13 of runway 15. Aircraft 11 has a constant velocity of 70 meters per second and is shown making a 3° glide slope. The runway is marked by radial beacon markers 17 and 19 at the front of runway 15 and radial beacon marker 21 at the rear. FIG. 1b shows progressive views of a display as aircraft 11 makes an approach as shown in FIG. 1a where $h$ is the height in meters, $l$ is the distance in meters from aircraft 11 to the beginning of runway 15, and $v$ is the velocity of aircraft 11 in meters per seconds. The three dots representing radial beacon markers 17, 19 and 21 offer a perspective presentation of the runway as seen from the display viewed from aircraft 11.

Figure 2A:
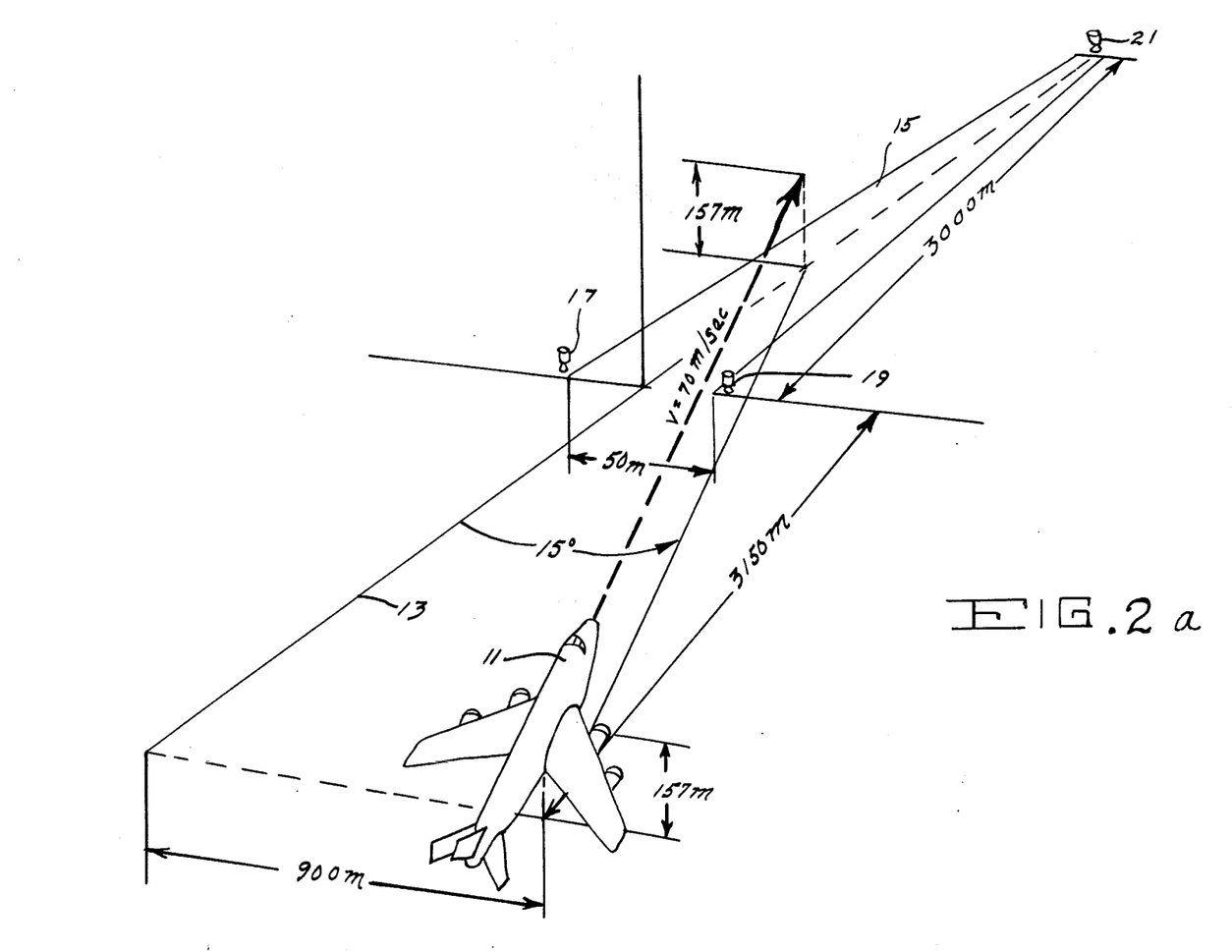
FIG. 2a is a perspective view of an aircraft in an overflight and at an angle to the runway.
Figure 2B:
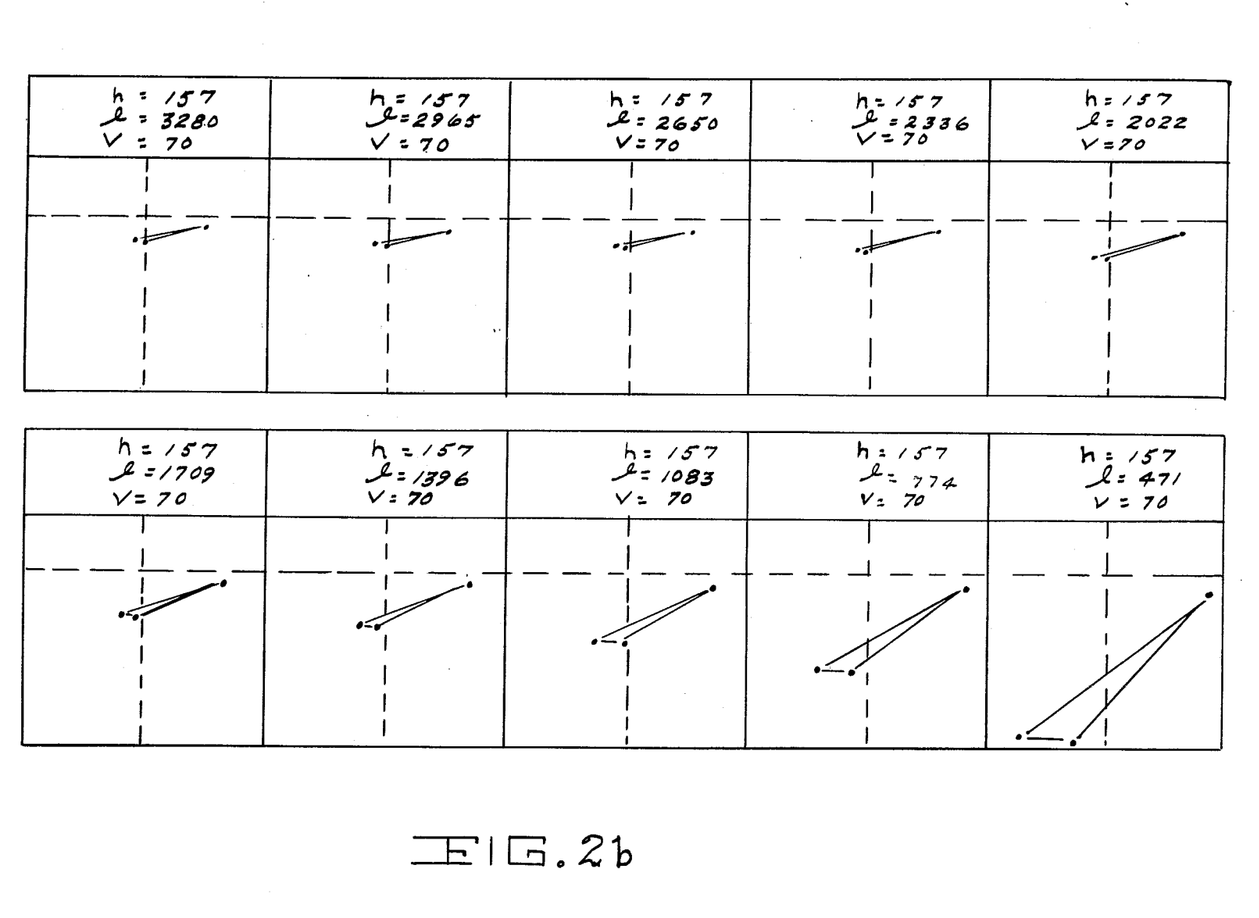

FIG. 2a is a perspective view of aircraft 11 approaching runway 15 in overflight 15° from center line 13 at constant height of 157 meters and a constant velocity of 70 meters per second. FIG. 2b shows progressive views as seen on a display from aircraft 11 of the approach as shown in FIG. 2a.

Figure 3A:
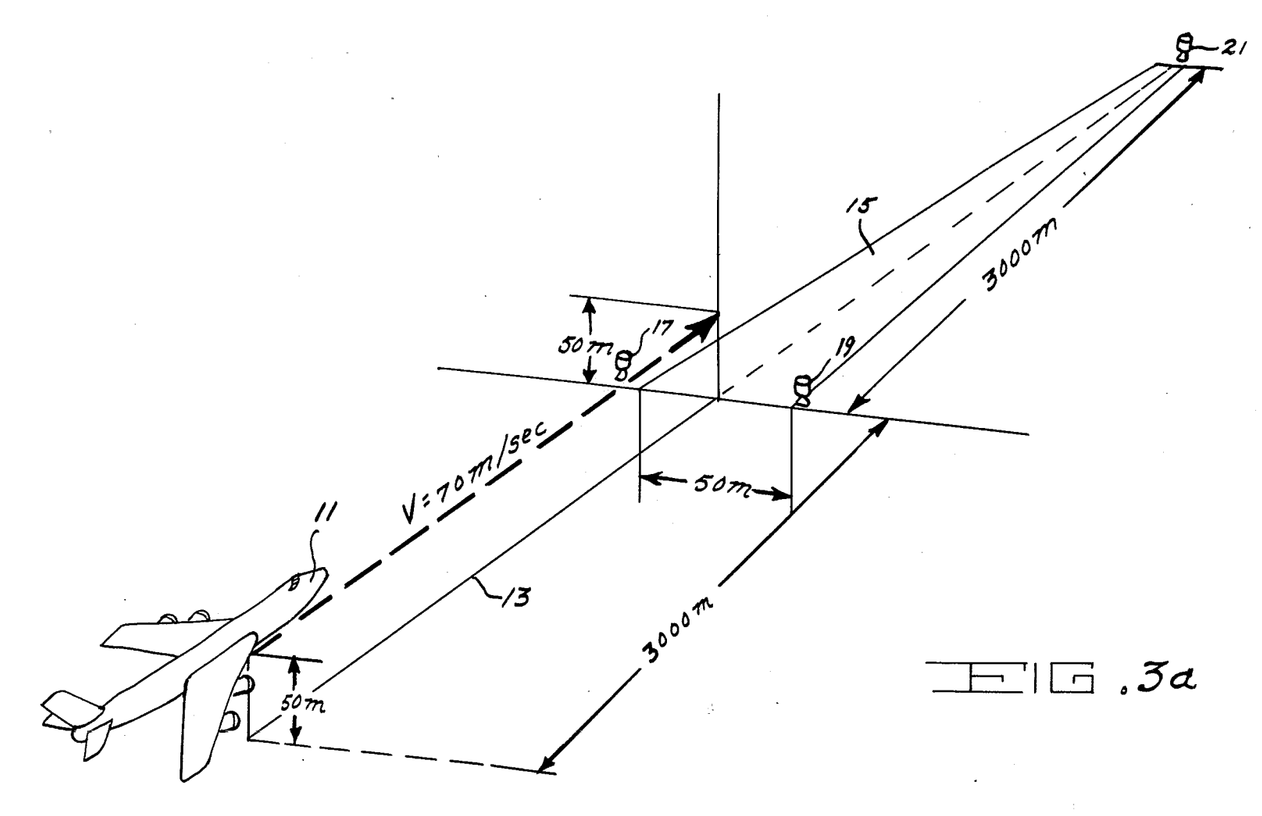
FIG. 3a is a perspective view of an aircraft in overflight but approaching on the center line of the runway.
Figure 3B:
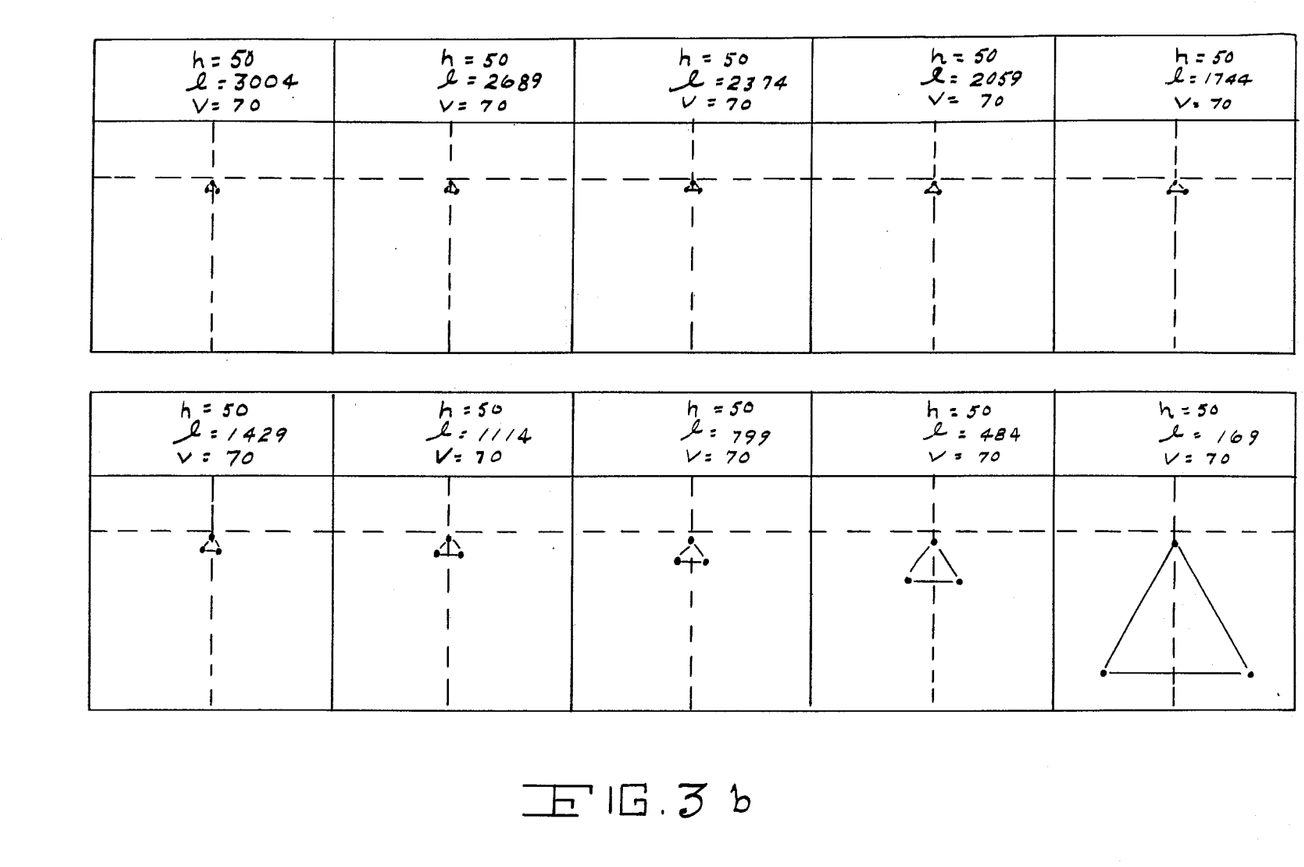

FIG. 3a is a perspective view of aircraft 11 approaching runway 15 on center line 13 but in an overflight at a height of 50 meters and a constant velocity of 70 meters per second. FIG. 3b shows progressive views as seen on a display from aircraft 11 of the approach as shown in FIG. 3a.

Figure 4A:
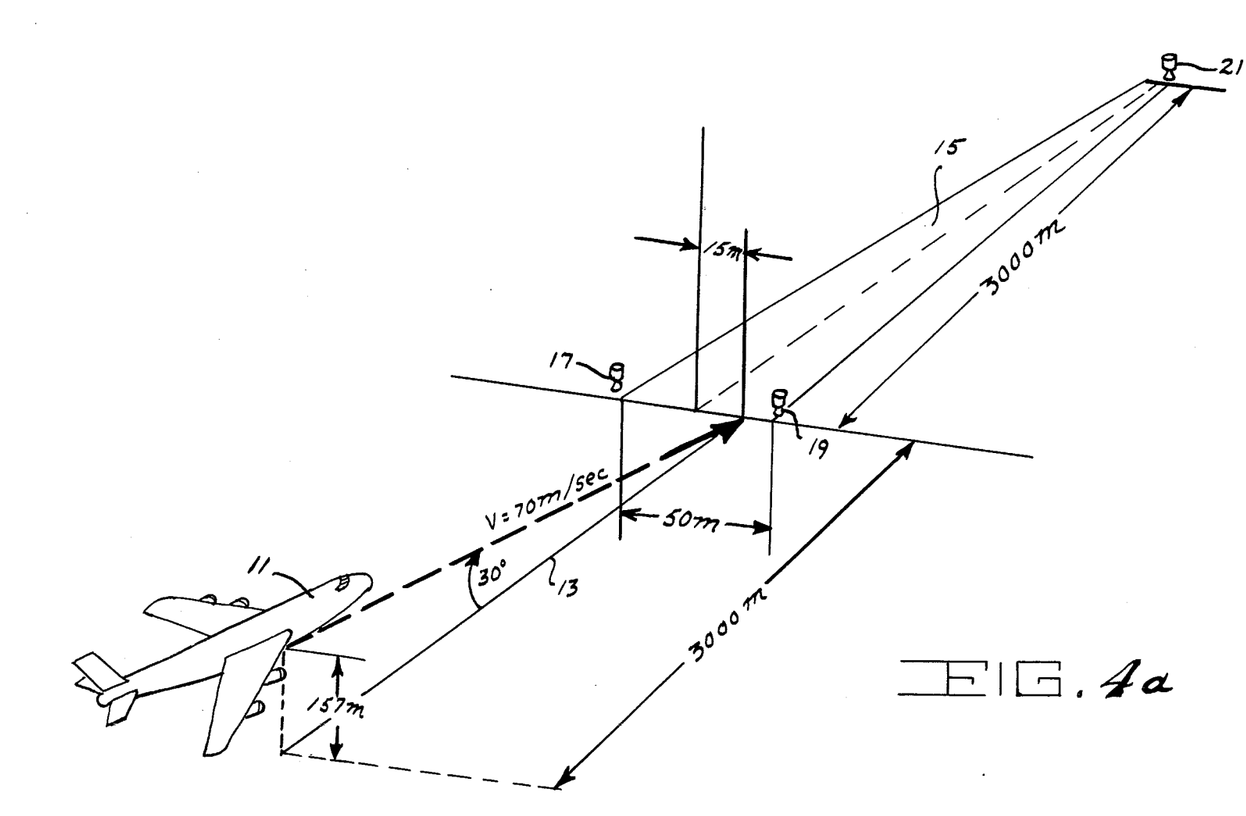
FIG. 4a is a perspective view of an aircraft in a missed approach, parallel but 15 meters off the center line of the runway.
Figure 4B:
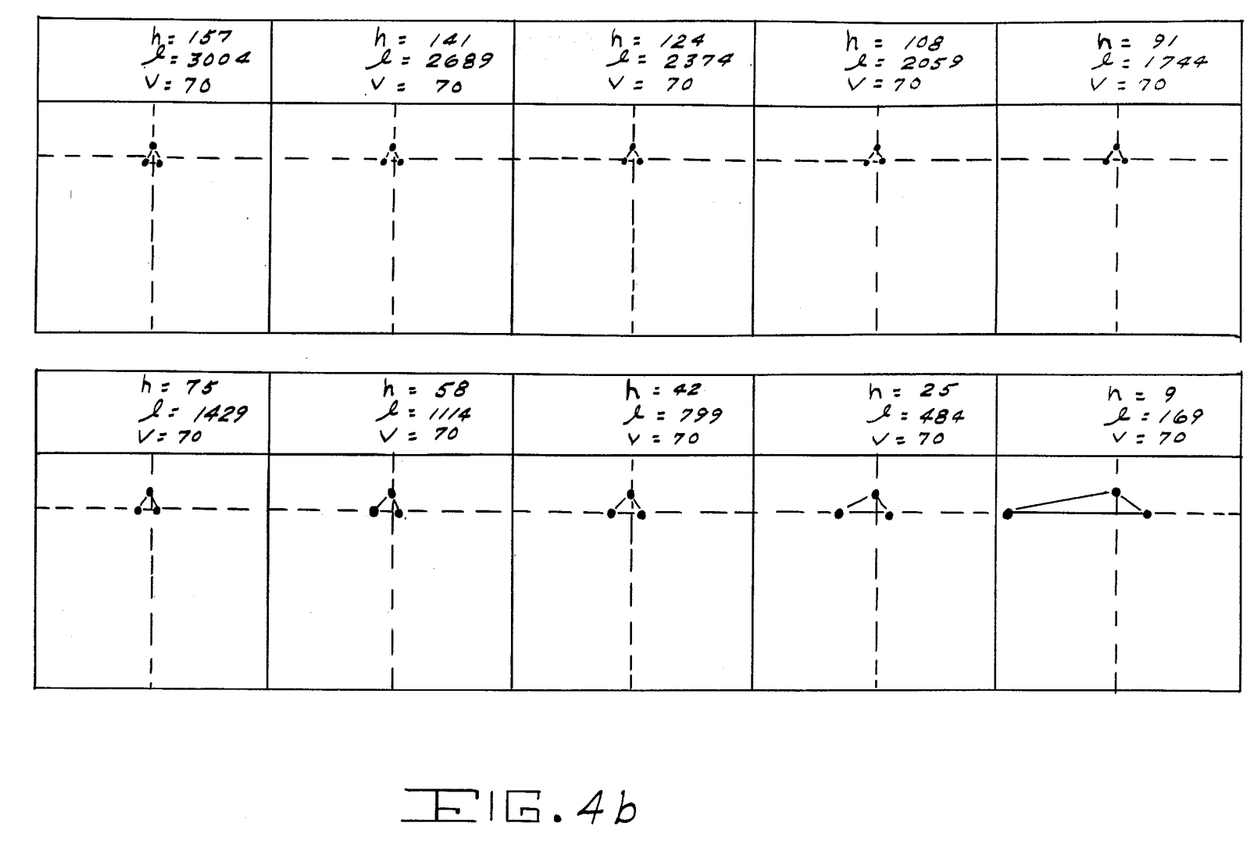

FIG. 4a is a perspective view of aircraft 11 approaching runway 15 in a missed approach and 15 meters off center line 13 with a 3° glide slope at a constant velocity of 70 meters per second. FIG. 4b shows progressive views seen on display of aircraft 11 of the approach as shown in FIG. 4a.

Figure 5A:
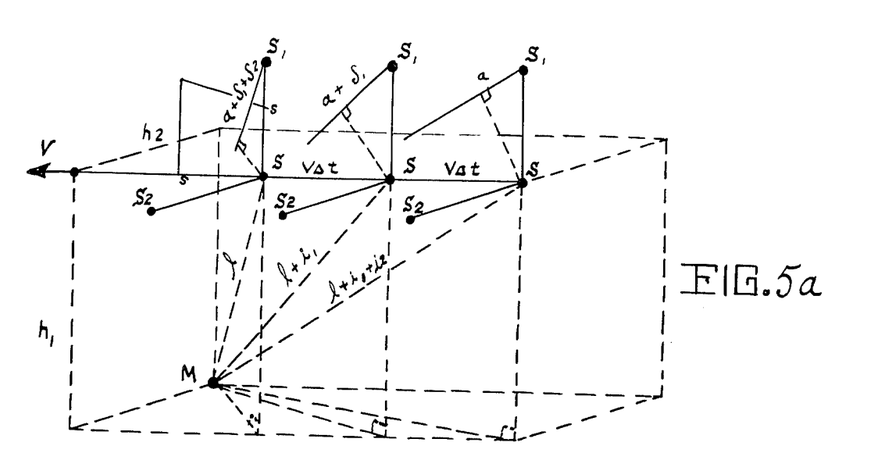
FIGS. 5a and 5b show the basic geometry which permit the determination of the distance from a moving sensor to a stationary marker.
Figures 5B, 6:
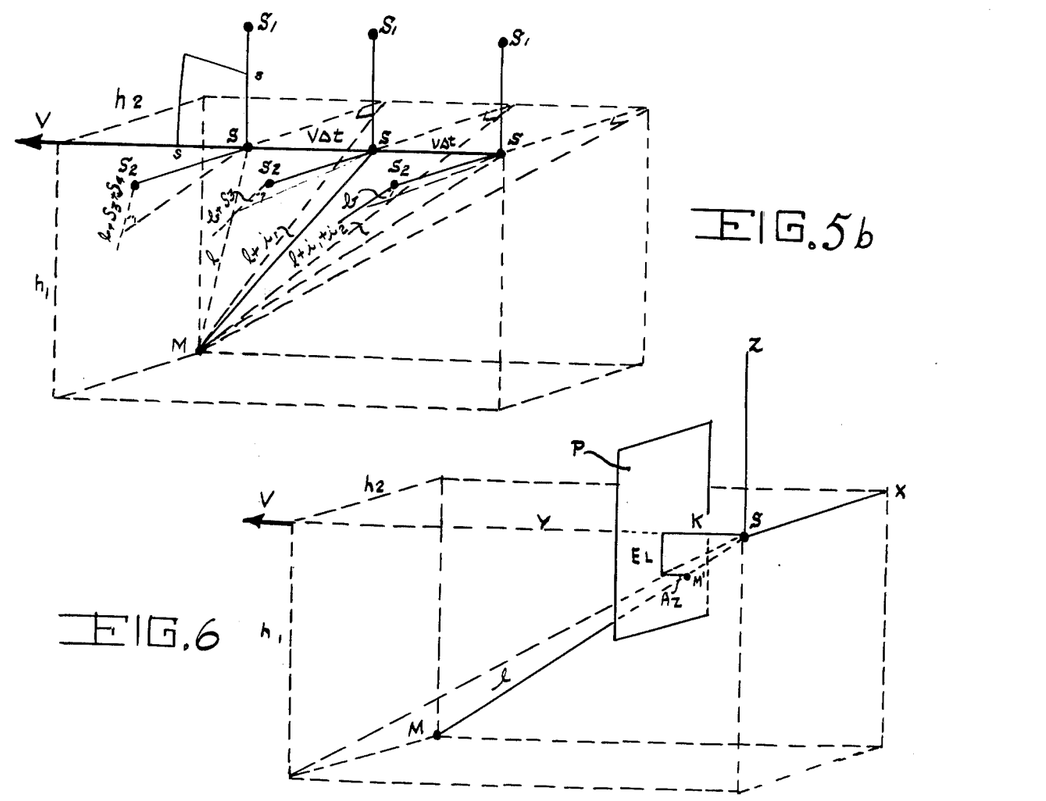
FIG. 6 is a basic geometric diagram showing the determination of radial and angular positions of a marker with respect to the reference plane.

In FIGS. 5a and 5b the basic geometry and measurements are outlined, which permit the determination of the distance $l$ of a moving sensor S from a stationary marker M, assuming a constant sensor velocity $v$. To establish a reference frame on board the vehicle, which is rigidly connected to it, additional sensors $S_1$ and $S_2$ are orthogonally mounted at distances $s$, so that $SS_1$ might be parallel to the vertical axis of an aircraft, $SS_2$ parallel to the transverse axis, and $v$ parallel to the longitudinal axis.

Considering the $SS_2$ direction which is the $x$ axis, the $v$ direction which is the $y$ axis, and the $SS_1$ which is the $z$ axis of the on board reference frame with its center at S as shown in FIG. 6, quantities $h_1$, $h_2$, and $l$ suffice to determine the radial and angular positions of the marker with respect to the reference frame.

FIG. 5a specifically shows how quantities $h_1$ and $l$ are derived from measurements taken at sensors or antennas S and $S_1$. An assumption is made in FIGS. 5a and 5b to simplify the equations, which is permissible in a practical system. Since the distance $l$ is large compared with $s$, the rays arriving at S, $S_1$ and $S_2$ are considered parallel.

Again, referring to FIG. 5a the triangular arrangement of antennas S, $S_1$, $S_2$ is initially located at the position to the right. An unknown path difference $a$ exists between the rays arriving at S and $S_1$ from M. When the sensors have moved a distance $v\Delta t$ to the center position, the path difference between them has increased by $\delta_1$. At the same time the distance between marker M and sensor S has decreased by $i_2$. After a second time interval $\Delta t$ the sensors S and $S_1$ have moved to the left position, and an additional path delay $\delta_2$ occurs between S and $S_1$ whereas the distance between M and S is reduced by $i_1$ to $l$.

Trigonometric relations derived from FIG. 5a yield $$l = \frac{\delta_1 i_1 (i_1 + i_2)}{\delta_2 i_2 - \delta_1 i_1} \tag{1}$$

$$h_1 = \frac{\delta_1 \delta_2 i_1 i_2 (\delta_1 + \delta_2)(i_1 + i_2)}{s \cdot (\delta_2 i_2 - \delta_1 i_1)^2} \tag{2}$$

The quantities $\delta_1$, $\delta_2$, $i_1$, $i_2$ have been introduced as distances. On board the vehicle they are measured as phase angles, either $\delta_1$ and $\delta_2$ between antennas S and $S_1$ or $i_1$ and $i_2$ between antenna S and an on board reference frequency standard $f$. The phase measurements are converted into distances by multiplication with $c/(2\pi f)$, where $c$ is the velocity of signal propagation.

In FIG. 5b the same system has been redrawn to demonstrate how $h_2$ and $l$ are determined from phase information gathered by antennas S and $S_2$. Exactly the same reasoning is applied as in FIG. 5a. Naming the unknown initial path difference $b$ and the path difference increase $\delta_3$ and $\delta_4$ between antennas S and $S_2$ analogous equations are obtained:

$$l = \frac{\delta_3 i_1(i_1 + i_2)}{\delta_4 i_2 - \delta_3 i_1} \tag{3}$$

$$h_2 = \frac{\delta_3 \delta_4 i_1 i_2 (\delta_3 + \delta_4)(i_1 + i_2)}{s(\delta_4 i_2 - \delta_3 i_1)^2} \tag{4}$$

Equations (1) and (3) may be averaged to obtain a more accurate distance value.

A further parameter of interest is the velocity $v$, which follows from appropriate trigonometric relations in FIGS. 5a or 5b:

$$v = \frac{1}{\Delta t} \sqrt{l(i_2 - i_1) + 0.5(i_1 + i_2)^2 - i_1^2} \tag{5}$$

Though an aircraft will generally fly with its longitudinal axis aligned with the velocity vector, conditions occur when there is an angular deviation $\alpha$ possible from the right angle between $v$ and either $SS_1$ or $SS_2$. This leads to an effective shortening of the base length $s$ to $s.\cos \alpha$, which is generally negligible because of the small deviation of the cosine function from 1 for small angles $\alpha$.

In FIG. 6 it has been assumed for reasons of simplicity that $h_1$, $h_2$, and $l$ have been determined for a particular marker M with respect to the on board $x$, $y$, $z$ reference system, and that a projection plane P is located parallel to the $xz$ plane at a distance $k$ with the pilot's eye positioned at S. Then marker M will project as M' into the projection plane with an azimuth coordinate $$AZ = \frac{k \cdot h_2}{\sqrt{l^2 - h_1^2 - h_2^2}} \tag{6}$$

and an elevation coordinate $$EL = \frac{k \cdot h_1}{\sqrt{l^2 - h_1^2 - h_2^2}} \tag{7}$$

With a minimum number of three runway markers M' displayed in the projection plane, the pilot recognizes the aircraft position and attitude with respect to the runway. The temporal sequence of updated displays will convey the information on whether the aircraft is on the correct flight path or not. Many other relative orientations of antennas and projection plane/observer configurations are conceivable, which generally result in more complicated mathematics.

Figure 7:
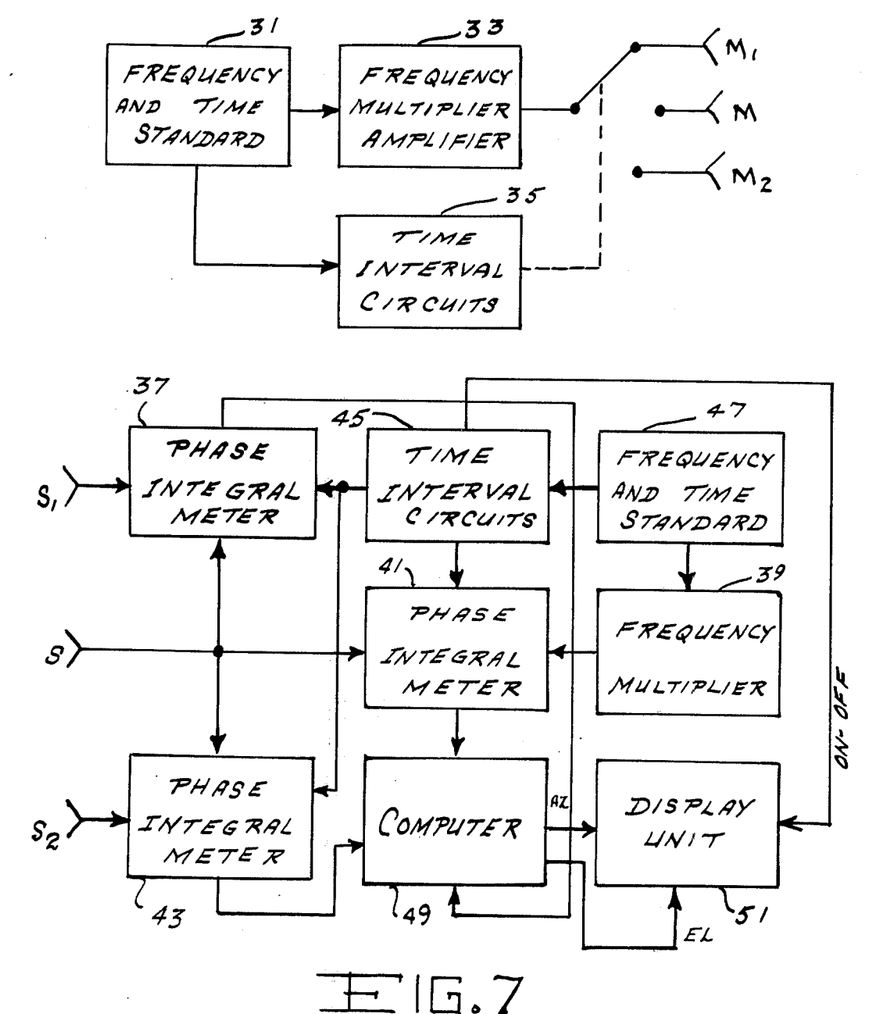
FIG. 7 is a block diagram of an embodiment of the invention.

An embodiment of the perspective navigation system is shown in FIG. 7 in block diagram form. The ground based equipment includes frequency and time standard 31, which could be a crystal oscillator. The transmitted signal having frequency $f$ is derived through conventional frequency multiplier and amplifier circuits 33. Timing signals are also generated from standard 31 using time interval circuits 35 which successively apply the transmitted signal $f$ to markers M, $M_1$ and $M_2$. Hence the signals from the markers are transmitted to aircraft 11 serially in this illustrative embodiment. It would be possible to transmit the signals parallel by generating and transmitting different frequencies for each marker. However, aboard aircraft 11 it would then be necessary to provide equipment at each sensor to detect each of the different transmitted frequencies.

The signals from each of the markers in sequence are received by the on board antennas S, $S_1$ and $S_2$ simultaneously and are connected to phase integral meters which have the function to determine the total phase difference accumulating between two input signals during the time interval $\Delta t$. Such a phase integral meter is manufactured by Hewlett-Packard, Model H-P 5360A. Signals from $S_1$ and S are fed to phase integral meter 37; signals from S and reference frequency multiplier 39 are fed to phase integral meter 41; and signals from S and $S_2$ are fed to phase integral meter 43. Time interval circuits 45 provide timing signals to phase integral meters 37, 41, 43 and are derived from frequency and time standard 47, which also feeds frequency multiplier 39. Outputs from phase integral meters 37, 41 and 43 are processed in computer 49 and are viewed in display unit 51. A display unit could be an oscilloscope with horizontal plus vertical inputs from computer 49 and on-off control or activating signal from time interval circuits 45.

In principle this system will operate at any frequency in the electromagnetic spectrum and can also make use of acoustic waves. Assuming that there is a minimum discernible phase change, the system resolution will be proportional to the frequency $f$.

Alternatively, the total scheme may be reversed with three triangularly arranged sensors fixed on the ground and three markers located on the linearly moving aircraft. Information on aircraft position, attitude and course could thus be derived on the ground and radioed back to the aircraft. If only position and course are required, a single marker on the aircraft suffices.

What is claimed is:

1. A system for displaying a perspective scene having a plurality of markers as viewed from a moving remote reference frame comprising:
   a. means for transmitting signals having a reference frequency from the plurality of markers in a sequence;
   b. a reference frequency source at the remote reference frame;
   c. first, second, and third means for sensing in sequence the transmitted signals with the first, second, and third sensing means having a predetermined spacing at the remote reference frame;
   d. a first measuring means, measuring the phase difference between the signals from the first and second sensing means;
   e. a second measuring means, measuring the phase difference between the signals from the first and third sensing means;
   f. a third measuring means, measuring the phase difference between the signals from the first sensing means and the reference frequency source;
   g. means for computing the radial and angular positions of each marker with respect to the reference frame, the computing means being fed by the first, second, and third measuring means; and
   h. means for displaying the positions fed by the computing means.

2. A system for displaying a perspective view according to claim 1 which further comprises time interval means for controlling the sequence for transmitting the signals.

3. A system for displaying a perspective view according to claim 2 wherein the means for displaying the positions comprise an oscilloscope having vertical and horizontal inputs fed by the computing means and an activating signal from the time interval means.

4. A method of displaying a perspective representation of an object from a remote and linearly moving reference frame comprising:
   a. transmitting reference signals from beacons positioned about the object;
   b. sensing the transmitted signals from first, second, and third sensors positioned on the moving reference frame;
   c. phase comparing the signal from the first sensor with a signal from a reference frequency source;
   d. phase comparing the signal from the first sensor with the signal from the second sensor;
   e. phase comparing the signal from the first sensor with the signal from the third sensor;
   f. computing perspective position coordinates based on the phase comparing; and
   g. displaying the perspective position coordinates.

5. A method of viewing a perspective representation of an object according to claim 4 wherein the transmitting of the beacon signals is performed sequentially.

* * * * *